United States Patent
McDowell et al.

(10) Patent No.: US 6,754,092 B2
(45) Date of Patent: Jun. 22, 2004

(54) METHOD AND APPARATUS FOR REDUCING POWER CONSUMPTION FOR POWER SUPPLIED BY A VOLTAGE ADAPTER

(75) Inventors: Chandler Todd McDowell, Austin, TX (US); Sani Richard Nassif, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/185,707

(22) Filed: Jun. 27, 2002

(65) Prior Publication Data

US 2004/0001346 A1 Jan. 1, 2004

(51) Int. Cl.[7] .............................. H02M 7/04; H02J 3/00
(52) U.S. Cl. ........................................ 363/89; 307/39
(58) Field of Search .............................. 363/89, 85, 95, 363/98, 69, 52; 323/280, 284, 281, 275, 272, 276; 320/139, 116, 160, 164; 307/66, 39, 35

(56) References Cited

U.S. PATENT DOCUMENTS

| 4,211,933 A | * | 7/1980 | Hedges et al. ................ 307/35 |
| 4,864,269 A | * | 9/1989 | Priebe ......................... 337/113 |
| 4,888,495 A | * | 12/1989 | Feron et al. .................. 307/39 |
| 5,191,277 A | * | 3/1993 | Ishikura et al. ............. 320/114 |
| 5,355,073 A | * | 10/1994 | Nguyen ..................... 320/116 |
| 5,506,790 A | * | 4/1996 | Nguyen ..................... 364/492 |
| 5,739,596 A | * | 4/1998 | Takizawa et al. ............ 307/66 |
| 6,373,150 B1 | * | 4/2002 | Fuller ......................... 307/140 |

* cited by examiner

Primary Examiner—Rajnikant B Patel
(74) Attorney, Agent, or Firm—Anthony V. S. England; Casimer K. Salys

(57) ABSTRACT

Power consumption is reduced for power supplied by a voltage adapter, such as an AC/DC adapter. A power source is connected to a power unit, including the voltage adapter and control circuitry. The voltage adapter supplies power to a load, such as a computer system. A load current supplied by the voltage adapter and an output voltage of the voltage adapter are measured by the control circuitry, and a control device of the control circuitry selectively disconnects the voltage adapter from the power source. The disconnecting is responsive to the control circuitry inferring from the measured current and voltage that the load is turned off, or at least operating in a reduced power consumption mode.

21 Claims, 4 Drawing Sheets

METHOD AND APPARATUS FOR REDUCING POWER CONSUMPTION FOR POWER SUPPLIED BY A VOLTAGE ADAPTER

BACKGROUND

1. Field of the Invention

This invention concerns supplying power to devices which utilize an AC to DC power supply or power adapter.

2. Related Art

On Jul. 31, 2001 the President of the United State issued the executive order, *Energy Efficient Standby Power Devices*. This executive order required that government agencies purchase equipment whose standby power is less then one Watt when possible. Australia is participating in the International Energy Agency's one Watt Program. The International Energy Agency has had three international workshops on standby power. Philips has programs, GreenChipTM and STARplugTM, that aim to reduce standby power and increase efficiency in power converters. ON Semiconductor has controllers for designing efficient wall adapters. This shows progress on making new devices with increased efficiency and reduced standby power, but legacy devices will continue to waste power until they have been phased out over a period of many years.

It should therefore be appreciated that the need exists to reduce standby power in existing devices.

SUMMARY

The foregoing need is addressed in the present invention. According to a method form of the invention, power consumption is reduced for power supplied by a voltage adapter, such as an AC/DC adapter, an AC/AC adapter, a DC/DC adapter or a DC/AC adapter. (A voltage adapter is also referred to sometimes as a voltage "converter.") In a first step, a power source is connected to a power unit, including the voltage adapter and control circuitry. The voltage adapter supplies power to a load, such as a computer system. A load current supplied by the voltage adapter and an output voltage of the voltage adapter are measured by the control circuitry, and a control device of the control circuitry selectively disconnects the voltage adapter from the power source. The disconnecting is responsive to the control circuitry inferring from the measured current and voltage that the load is low, i.e., turned off, or at least operating in a reduced power consumption mode. (In this context the term, "turned off" is meant to include the load being disconnected from the power unit.)

In another aspect, the control circuitry infers that the load is low by comparing the output voltage and current to respective threshold values.

In a still further aspect, the load is considered to be low if the output voltage is high (also referred to herein as a "normal" output voltage) and the load current is low. This circumstance indicates that the power unit is turned on, but the load is drawing less power than it does in normal operation. For example, the device drawing the load may be in a sleep mode, or it may be turned off. In this circumstance, disconnecting the supply line from the voltage adapter reduces leakage power in the adapter.

In yet another aspect, the disconnecting is responsive to the control circuitry inferring that load is drawing more power than is desirable (referred to herein as an "overload"). This is inferred from a high load current and a low output voltage. For example, a computer system load may have a malfunctioning battery, or there may be a short circuit on the output of the voltage adapter. In this circumstance, disconnecting the supply line protects the adapter from overload.

Objects, advantages, additional aspects and other forms of the invention will become apparent upon reading the following detailed description and upon reference to the accompanying drawings.

DETAILED DESCRIPTION OF A PREFERRED EMBODIMENT

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
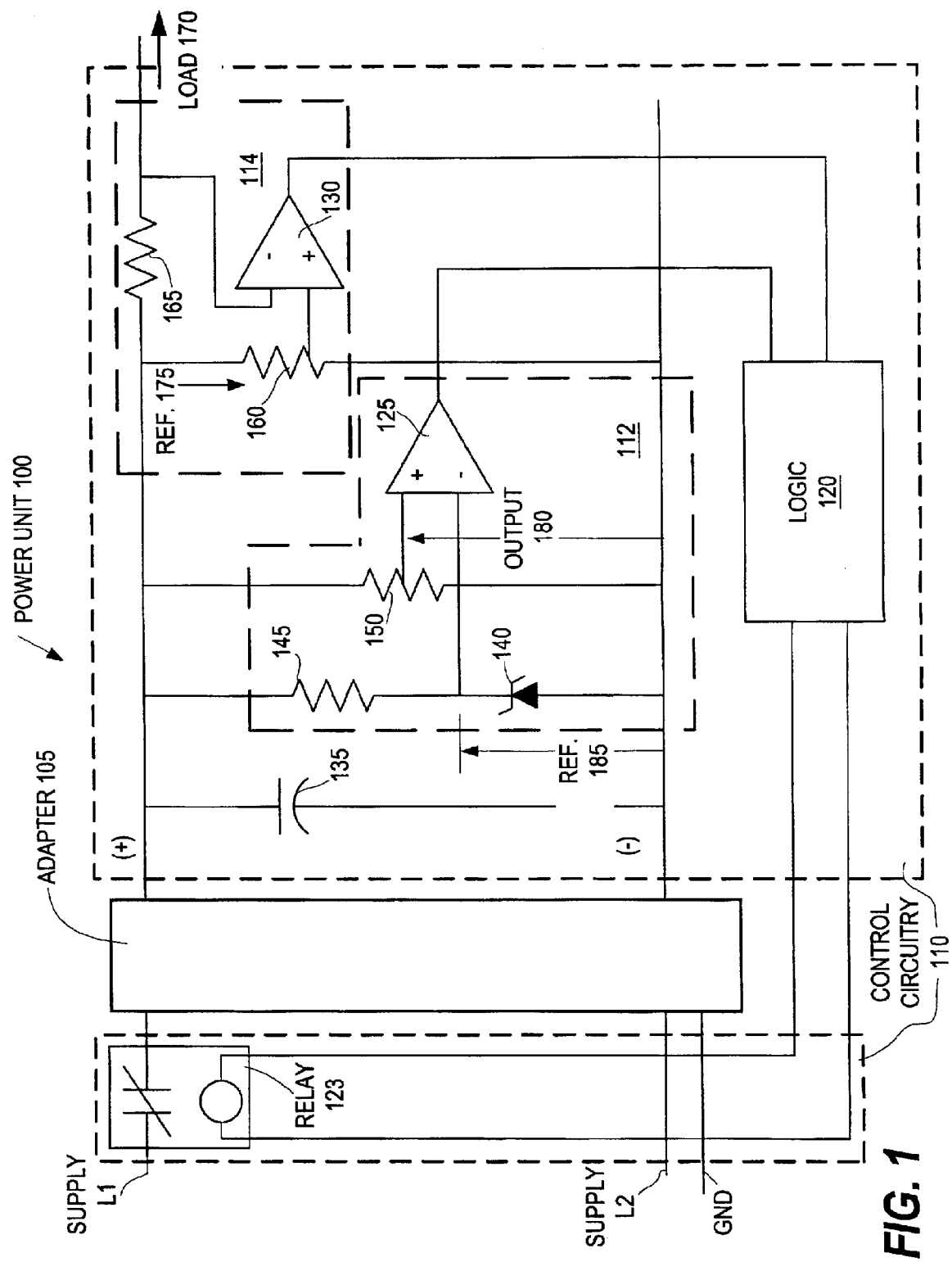
FIG. 1 illustrates a power unit, according to an embodiment of the present invention.

Referring now to FIG. 1, a power unit 100 is illustrated, according to an embodiment of the present invention. The power unit 100 includes a voltage adapter 105, which receives AC power from supply lines L1 and L2, and control circuitry 110, which monitors the adapter 105 and selectively disconnects one of the supply line from the adapter 105. The control circuitry 110 does this by measuring certain voltages and currents that are output by the adapter 105, inferring from these measurements, by logic 120, certain logical states, and energizing or de-energizing relay 123 responsively. Control relay 123 has normally closed contacts in series between the supply line L1 and the adapter 105, so that when the relay 123 is energized by logic 120 the contact opens and disconnects the adapter 105 from supply line L1. (It should be understood that in another embodiment the control relay, including the contacts, may be replaced by one or more solid state devices.)

More specifically, the adapter 105 converts the supplied alternating current ("AC") power to direct current ("DC") power, and outputs the DC power on output lines (+) and (−). Control circuitry 110 includes capacitor 135, which charges when the adapter is turned on. The capacitor 135 tends to reduce transient voltages and currents. Control circuitry 110 also includes voltage measuring circuitry 112 and current measuring circuitry 114.

The voltage measuring circuitry 112 of the illustrated embodiment includes resistor 145 connected in series with zener diode 140. The resistor 145 and zener diode 140 are connected in parallel with the output of the adapter 105, that is, across the output lines (+) and (−). Another resistor 150 of the voltage measuring circuitry 112 is also connected in parallel with the adapter 105 output.

Voltage measuring circuitry 112 also includes a differential voltage measuring operational amplifier 125 that generates a high output signal if the output voltage 180 is above a certain threshold value. More specifically, the voltage measuring circuitry 112 if FIG. 1 has a first input coupled to resistor 150 in such a way as to measure the voltage drop across a portion of the resistor 150, and has a second input coupled to the anode of diode 140 so as to measure the voltage drop across the diode 140. Thus, the first input of amplifier 125 measures an output voltage 180 which is proportional to the adapter 105 output voltage, that is the voltage across the output lines (+) and (−). And the second input of amplifier 125 measures a reference voltage 185 that is considered to be the "threshold value" for the output voltage 180. (The voltage 185 is held constant by diode 140 as long as the adapter 105 output voltage exceeds the threshold voltage of the diode 140.) The amplifier 125 compares the voltages on its first and second inputs, i.e., measures the differences between the input voltages, and generates an output signal responsive to the difference. The output signal is fed to logic circuitry 120.

Thus if the output voltage 180 is above the threshold value the amplifier 125 output is high. This condition is referred to herein as a "high" or "normal" adapter 105 output voltage. If the output voltage 180 is equal to or below the threshold value the amplifier 125 output is low. This condition is referred to herein as a "low" or "below normal" adapter 105 output voltage.

Current measuring circuitry 114 has a differential voltage measuring operational amplifier 130 that generates a high output signal if load current 170 is above a certain threshold value. More specifically, current measuring circuitry 114 of FIG. 1 has a resistor 160 connected in parallel with the adapter 105 output and a resistor 165 connected in series with the adapter 105 output, that is, in series with the adapter 105 output line (+) and the load (not shown) supplied by the adapter 105. A first input of the amplifier 130 is coupled to the load side of resistor 165, while a second input is coupled to a portion of resistor 160. Thus, the first input of amplifier 130 measures the voltage drop across resistor 165, and the second input of amplifier 130 measures the voltage drop across resistor 160. The amplifier 130 generates an output signal to the logic circuitry 120 responsive to the difference between the two measured input voltages.

The voltage measured by the first input to amplifier 130 (the input with the (−) polarity) is proportional to the load current 170 through resistor 165 that is supplied by adapter 105 to the load (not shown in FIG. 1). Specifically, as the load current 170 increases the amplifier (−) input voltage decreases. The voltage measured by the second input to amplifier 130 (the input with the (+) polarity) is proportional to a reference current 165 through resistor 160 so that the magnitude of the (+) input voltage increases as the reference current 175 increases. Aside from variation in output voltage, reference current 175 (and the corresponding voltage that it generates across resistor 160) is substantially independent of the load on adapter 105, since this current is determined by the adapter 105 output voltage and the size of resistor 160, which is fixed.

If the amplifier 130 (+) input voltage exceeds the (−) input voltage the load current 170 is referred to herein as "high" or "normal," that is, above its "threshold value," and the amplifier 130 output responsively goes high. Conversely, if the amplifier 130 (+) input voltage is equal to or less than the (−) input voltage the load current 170 is referred to herein as "low" or "below normal," and the amplifier 130 output responsively goes low.

Figure 2:
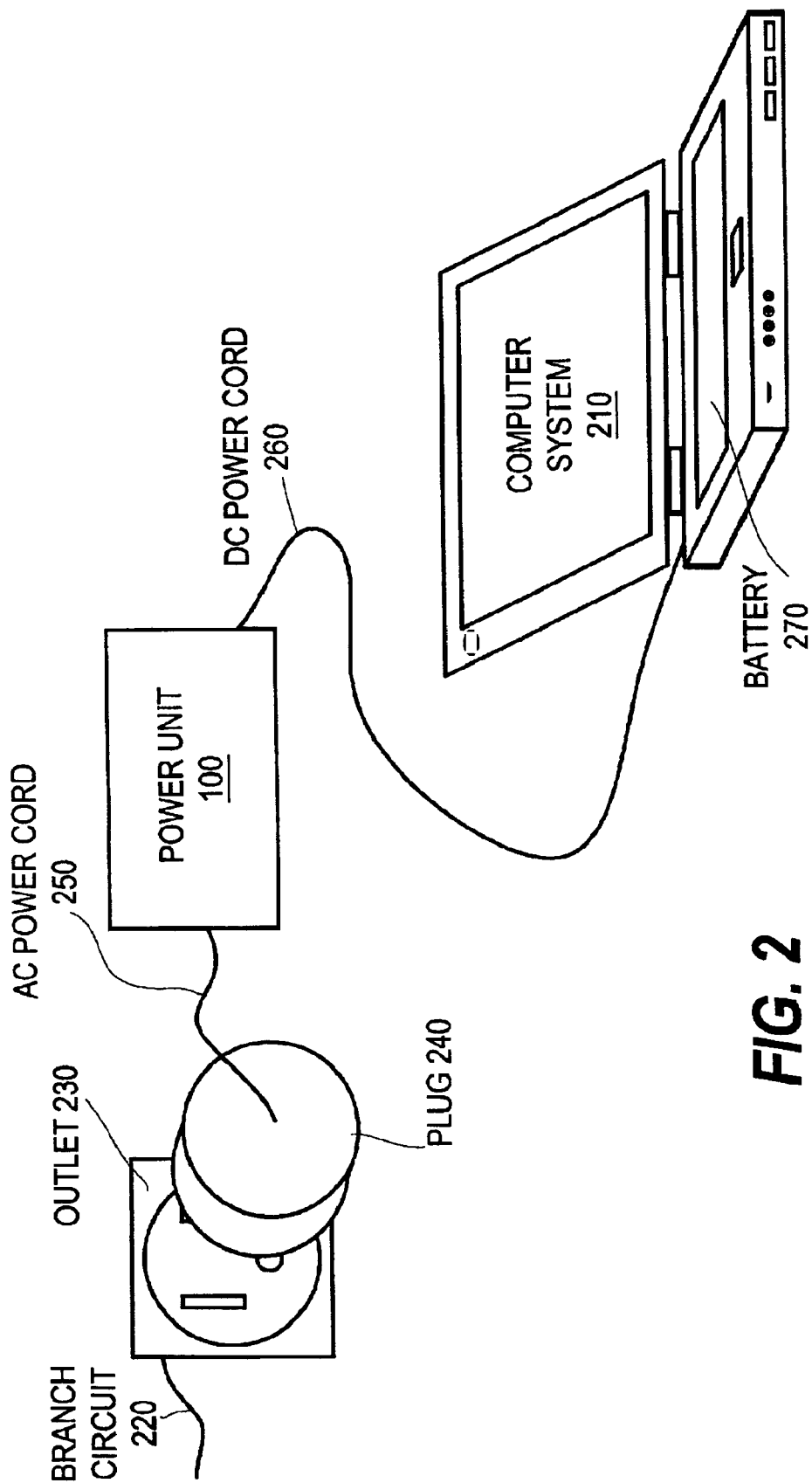
FIG. 2 illustrates an application of the power unit of FIG. 1.

Referring now to FIG. 2, an application of the power unit 100 of FIG. 1 is shown, according to an embodiment of the present invention. The power unit 100 is connected by an AC power cord to an AC branch circuit 220 via a power plug 240 and an electrical outlet 230. The power unit 100 supplies DC power to a battery 270 of computer system 210 via DC power cord 260.

Referring again to FIG. 1, in connection also with FIG. 2, the computer 210 may, of course, be turned off independently of whether the power unit is unplugged from the electrical outlet 230. However, if the voltage adapter 105 of the power unit 100 is not disconnected when the computer system 210 is turned off, the adapter will continue to consume some power due to unavoidable losses, that is, leakage power, even if the battery 270 is fully charged and even if the DC power cord 260 is disconnected from the battery 270. The logic 120 of control circuitry 110 infers from the voltages measured by amplifiers 125 and 130 (and the currents 170 and 175 impliedly measured) whether the computer system 210 is disconnected from the power unit 100, or at least turned off with the battery substantially charged, by determining whether the load current 170 is below normal at the same time that the output voltage 180 is normal. That is, if the load current 170 is below normal while the output voltage 180 is normal this indicates the adapter 105 is powered up but there is no load or only a small load on the adapter. In this state logic 210 energizes relay 123 and disconnects line L1 from adapter 105, thereby reducing leakage power.

In a protection feature, logic 120 also detects an overload condition by comparing the measurements of amplifiers 125 and 130 and determining that the load current 170 is high, indicating that the adapter 105 is powered up, at the same time that the output voltage 180 is low, indicating the output voltage 180 has been pulled down to an abnormally low level. This circumstance may indicate that computer system 210 is drawing more power than is desirable, for example, the battery 270 may be malfunctioning or there may be a short circuit on the output of the voltage adapter 105. Disconnecting the supply line L1 in this circumstance protects the adapter 105 from damage due to the overload.

A truth table is set out below for the power unit 100 logic operation.

TABLE ONE

| (Column 1) Indicated State | (Column 2) Current Normal | (Column 3) O/P Voltage Normal | (Column 4) Logic 120 O/P |
|---|---|---|---|
| (Row 1) normal (off) | 0 | 0 | 0 |
| (Row 2) low or no load | 0 | 1 | 1 |
| (Row 3) overload | 1 | 0 | 1 |
| (Row 4) normal (on) | 1 | 1 | 0 |

Referring now to Table One in connection with FIG. 1, column (2) of the indicates the state of the amplifier 130 output. That is, if it is true that the load current 170 is normal (i.e., above its threshold), the amplifier 130 output is high, represented by a "1" in column (2), otherwise the amplifier output 130 is low, represented by a "0" in column (2).

Column (3) of the indicates the state of the amplifier 125 output. That is, if it is true that the output voltage 180 is normal (i.e., above its threshold), the amplifier 125 output is high, otherwise the amplifier 125 output is low.

Column (4) indicates the state of the logic 120 output. If the inputs from amplifiers 125 and 130 are orthogonal, as in rows (2) and (3), the logic output 120 is asserted, which turns on the control relay 123 disconnecting L1 from adapter 105.

Column (1) in the table indicates the conditions of interest for the power unit 100. If the input from amplifier 130 is low while the input from amplifier 125 is high this indicates a no load, or at least low load condition. (Row 2.) If the input from amplifier 130 is high while the input from amplifier 125 is low this indicates an overload condition. (Row 3.) Otherwise, the power unit 100 is in a normal state, either powered up (Row 4) or powered off (Row 1).

Figure 3:
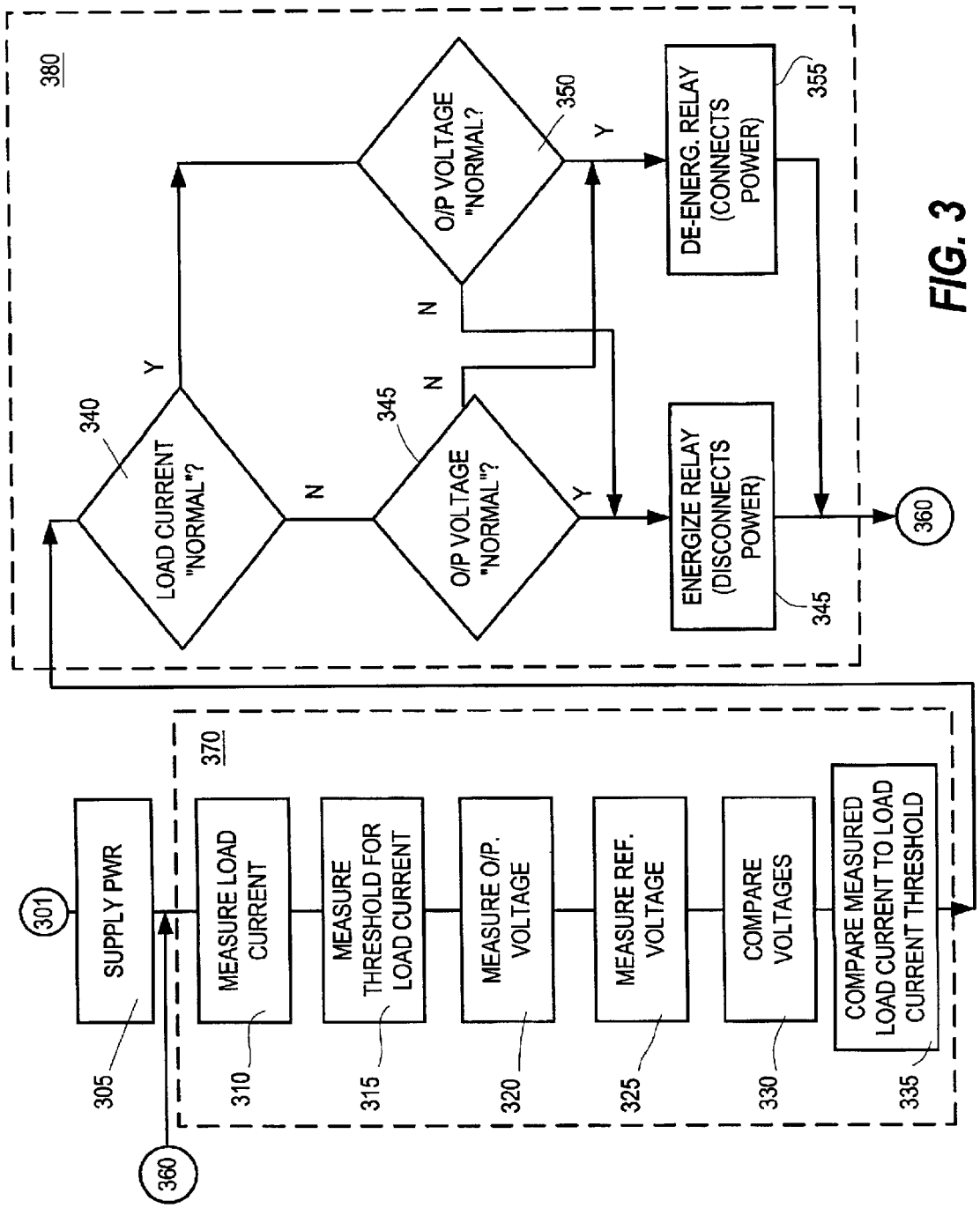
FIG. 3 illustrates certain aspects of logic operation for the power unit, according to an embodiment of the present invention.

Referring now to FIG. 3 in connection with FIG. 1, certain logic aspects are illustrated for operation of the power unit 100 (FIG. 1), according to an embodiment of the present invention. In particular, logic block 380 illustrates operation of the logic circuitry 120 (FIG. 1), while logic block 370 illustrates operation of the amplifiers 125 and 130 (FIG. 1). It should be understood although these operations are illustrated as a flow chart, and, as such, they are shown in a particular sequence, nevertheless, these operations are not necessarily performed in the particular sequence. Moreover, in many or even all respects the operations may be performed concurrently.

The logic aspects are shown to be initiated at 301, and power is supplied to the power unit at block 305. Amplifier 130 measures the load current 170 supplied by adapter 105 at block 310, and at block 315 measures the threshold value, i.e., reference current 175, for the load current. Amplifier 125 measures the output voltage 185 supplied by adapter 105 at block 320, and measures the reference voltage 180 at block 325. At block 330 amplifier 125 compares the measured voltages and generates an output signal in accordance with Table One. At block 335 amplifier 130 compares the measured currents and generates an output signal in accordance with Table One.

At block 340 logic circuitry 120 analyzes whether the load current is normal (as indicated by the output of amplifier 130). If the load current is below normal, then at block 345 logic circuitry 120 analyzes whether the output voltage is normal (as indicated by the output from amplifier 125). If the load current is below normal and the output voltage is normal, then at block 345 logic circuitry 120 energizes the control relay 123, in order to disconnect supply line L1 from the adapter 105. If, on the other hand, the load current is below normal and the output voltage is below normal, then at block 355 logic circuitry 120 allows the control relay 123 to remain in a de-energized state so that supply line L1 remains connected to the adapter 105.

If at block 340 normal load current is detected, then at block 350, logic circuitry 120 analyzes whether the output voltage is normal. If normal output voltage is detected at 350 and load current is normal, then at block 355 logic circuitry 120 allows the control relay 123 to remain de-energized. If below normal output voltage is detected at block 350 and load current is normal, then at block 345 logic circuitry 120 energizes the control relay 123, disconnecting power from the adapter. From blocks 345 and 355 the logic branches, at 360, back to block 310 and the logic operations are repeated.

Referring again to FIG. 1, note that in an embodiment the logic 120 of the power unit 100 will cycle power to the adapter 105 under no load conditions. That is, upon detecting the no load condition the logic 120 will disconnect the power line L1 from the adapter 105. With the power disconnected the output voltage 180 will decay (although held up somewhat by capacitor 135). Eventually the output voltage 180 will decay to the threshold voltage 185 of the diode, at which point the amplifier 125 output will change state and the control circuitry 120 will momentarily energize the relay 123 until the adapter 105 restores the output voltage 180, at which time the cycle will repeat.

The description of the present embodiment has been presented for purposes of illustration, but is not intended to be exhaustive or to limit the invention to the form disclosed. Many modifications and variations will be apparent to those of ordinary skill in the art. For example, while certain aspects of the present invention have been described in the context of particular circuitry, those of ordinary skill in the art will appreciate that processes of the present invention are capable of being performed by a processor responsive to stored instructions, and accordingly some or all of the processes may be distributed in the form of a computer readable medium of instructions in a variety of forms and that the present invention applies equally regardless of the particular type of signal bearing media actually used to carry out the distribution. Examples of computer readable media include RAM, flash memory, recordable-type media, such a floppy disk, a hard disk drive, a ROM, and CD-ROM, and transmission-type media such as digital and analog communications links, e.g., the Internet.

Figure 4:
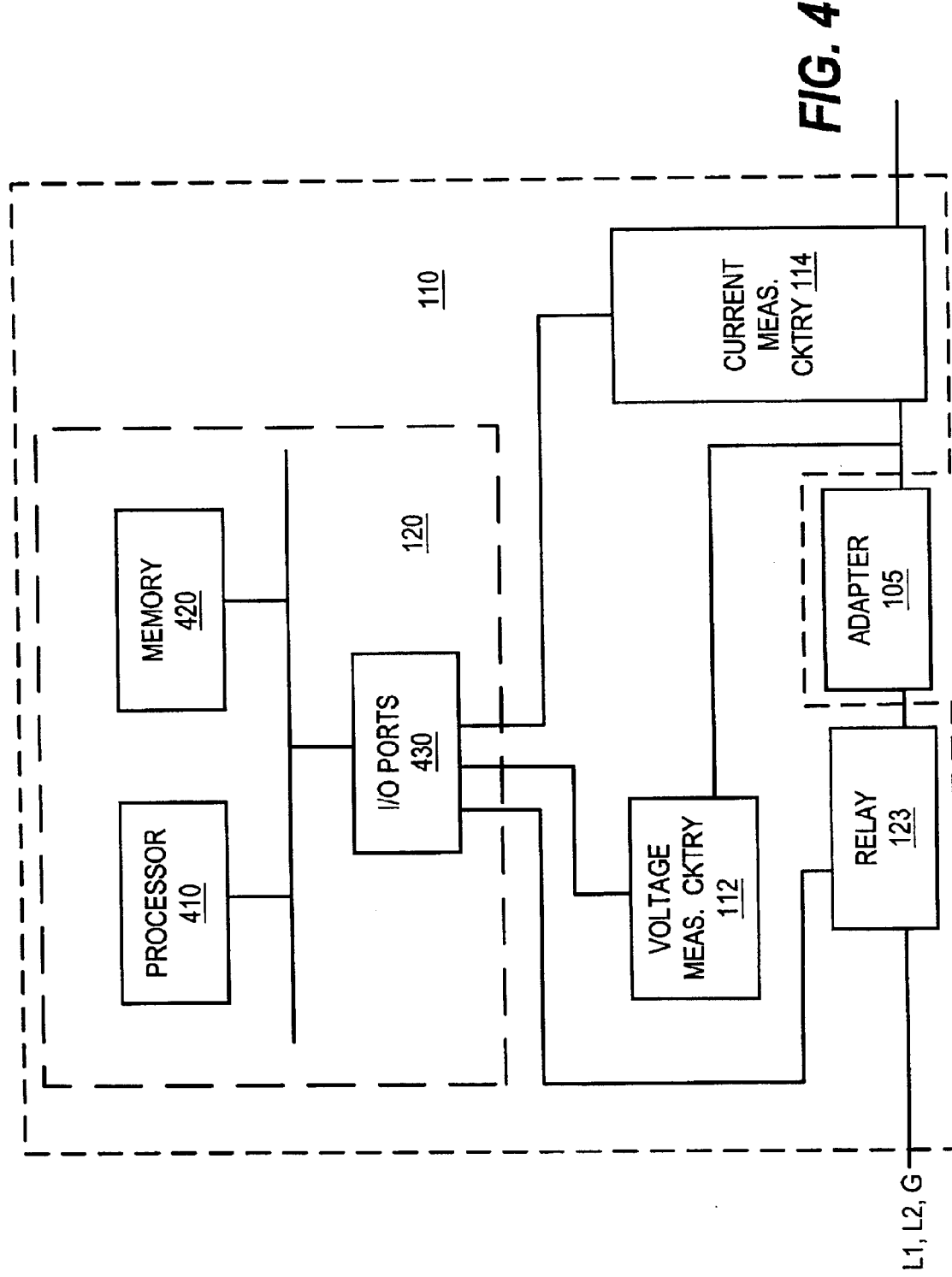
FIG. 4 illustrates details of logic circuitry of the power unit, according to an embodiment of the present invention.

FIG. 4 illustrates an embodiment of the present invention according to the description immediately above. Logic 120 of FIG. 1 in this embodiment includes a processor 410, memory 420 and input/output ports 430 coupled to a bus 440. The I/O ports 430 receive inputs from the voltage measurement circuitry 112 and current measurement circuitry and send a control signal output to the relay 123 responsive to the logic 120 controlled by a program.

Regarding other variations and alternatives, for example, in another embodiment, the computer 210 of FIG. 2 has at least one mode of operation in which power consumption by the computer 210 is reduced, such as a hibernation mode or a sleep mode, as is well known, and the control circuitry 110 of FIG. 1 infers from the measurements by amplifiers 125 and 130 that the computer system is at least operating in one of these reduced power consumption modes.

While the power unit has been described as being applied for supplying a computer system, it should be understood that it may also be applied for supplying other loads, such as a rechargeable flashlight, a battery charger, an audio and/or video playback or recording device, etc. Also, it should be understood that there are many ways to measure current and voltage and that in other embodiments the voltage and current measurement circuitry are configured in a different fashion or from different elements than illustrated herein.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention. Moreover, it should be understood that the actions in the following claims do not necessarily have to be performed in the particular sequence in which they are set out.

What is claimed is:

1. A method for reducing power consumption of a voltage adapter connected to a power source, the method comprising the steps of:
   a) supplying power to a power unit, wherein the power unit includes a voltage adapter and control circuitry;
   b) measuring a load current supplied by the voltage adapter and an output voltage of the voltage adapter; and
   c) selectively disconnecting the voltage adapter from the power source by a control device of the control circuitry, wherein the disconnecting is responsive to the control circuitry inferring from the measured current and voltage that the load is low based on output voltage and load current thresholds.

2. The method of claim 1, wherein the control circuitry infers that the load is low if the comparing indicates that the output voltage is greater than its threshold and the load current is less than its threshold.

3. The method of claim 2, comprising the step of selectively disconnecting the power line from the voltage adapter responsive to the control circuitry inferring from the measured current and voltage that the power unit is on and in an overloaded condition.

4. The method of claim 3, wherein the control circuitry infers that power unit is on and in an overloaded condition if the output voltage is less than its threshold and the load current is greater than its threshold.

5. The method of claim 1, wherein the voltage adapter converts AC voltage to DC voltage.

6. The method of claim 1, comprising the step of determining the voltage threshold, wherein the determining includes measuring a voltage drop across at least a diode, the diode being connected in parallel with the voltage adapter output, and wherein measuring the output voltage includes measuring a voltage drop across at least a portion of at least a first resistor, the first resistor being connected in parallel with the voltage adapter output.

7. The method of claim 1, wherein measuring the load current includes measuring a voltage drop across at least a portion of at least a second resistor, the second resistor being connected in series between the voltage adapter and a load, and wherein the method comprises the step of determining the current threshold, wherein the current threshold determining includes measuring a voltage drop across at least a portion of ax least a third resistor, the third resistor being connected in parallel with the voltage adapter output.

8. An apparatus for reducing power consumption of a voltage adapter connected to a power source, the apparatus comprising:

a voltage adapter; and control circuitry, wherein the control circuitry is operable to measure a load current supplied by the voltage adapter and an output voltage of the voltage adapter and selectively disconnect the voltage adapter from the power source by a control device of the control circuitry, wherein the disconnecting is responsive to the control circuitry inferring from the measured current and voltage that the load is low based on output voltage and load current thresholds.

9. The apparatus of claim 8, wherein the control circuitry infers that the load is low if the comparing indicates that the output voltage is greater than its threshold and the load current is less than its threshold.

10. The apparatus of claim 9, wherein the control circuitry selectively disconnects the power line from the voltage adapter responsive to the control circuitry inferring from the measured current and voltage that the power unit is on and in an overloaded condition.

11. The apparatus of claim 10, wherein the control circuitry infers that power unit is on and in an overloaded condition if the output voltage is less than its threshold and the load current is greater than its threshold.

12. The apparatus of claim 9, wherein the voltage adapter converts AC voltage to DC voltage.

13. The apparatus of claim 9, wherein the control circuitry determines the voltage threshold responsive to measuring a voltage drop across at least a diode, the diode being connected in parallel with the voltage adapter output, and wherein the control circuitry measuring the output voltage includes measuring a voltage drop across at least a portion of at least a first, resistor, the first resistor being connected in parallel with the voltage adapter output.

14. The apparatus of claim 9, wherein the control circuitry measuring the load current includes measuring a voltage drop across at least a portion of at least a second resistor, the second resistor being connected in series between the voltage adapter and a load, and wherein the control circuitry determines the current threshold responsive to measuring a voltage drop across at least a portion of at least a third resistor, the third resistor being connected in parallel with the voltage adapter output.

15. A computer program product for reducing power consumption of a voltage adapter connected to a power source, the computer program product comprising:

instructions for causing control circuitry of the voltage adapter to read a flint control circuitry input signal, the first control circuitry input signal being responsive to measuring a load current supplied by the voltage adapter, and to read a second control circuitry input signal, the second control circuitry input signal being responsive to measuring an output voltage of the voltage adapter; and instructions for causing the control circuitry to selectively disconnect the voltage adapter from the power source, wherein the disconnecting is responsive to the control circuitry inferring from the measured current and voltage that the load is low based on output voltage and load current thresholds.

16. The computer program product of claim 15, wherein the control circuitry infers that the load is law if the output voltage is greater than its threshold and the load current is less than its threshold.

17. The computer program product of claim 16, comprising instructions for causing the control circuitry to infer that the power unit is on and in an overloaded condition and to responsively disconnect the power line from the voltage adapter.

18. The computer program product of claim 17, wherein the control circuitry infers that power unit is on and in an overloaded condition if the output voltage is less than its threshold and the load current is greater than its threshold.

19. The computer program product of claim 15, wherein the voltage adapter converts AC voltage to DC voltage.

20. The of computer program product of claim 15, comprising instructions for determining the voltage threshold, wherein the determining includes measuring a voltage drop across at least a diode, the diode being connected in parallel with the voltage adapter output, and wherein measuring the output voltage includes measuring a voltage drop across at least a portion of at least a first resistor, the first resistor being connected in parallel with the voltage adapter output.

21. The computer program product of claim 15, wherein measuring the load current includes measuring a voltage drop across at least a portion of at least a second resistor, the second resistor being connected in series between the voltage adapter and a load, and wherein the computer program product comprises comprising instructions for determining the current threshold, wherein the current threshold determining includes measuring a voltage drop across at least a portion of at least a third resistor, the third resistor bring connected in parallel with the voltage adapter output.

* * * * *

UNITED STATES PATENT AND TRADEMARK OFFICE
CERTIFICATE OF CORRECTION

PATENT NO.   : 6,754,092 B2
DATED        : June 22, 2004
INVENTOR(S)  : McDowell et al.

It is certified that error appears in the above-identified patent and that said Letters Patent is hereby corrected as shown below:

Column 7,
Line 31, please delete "ax" and replace it with -- at --.

Signed and Sealed this

First Day of February, 2005

JON W. DUDAS
*Director of the United States Patent and Trademark Office*